US011920057B2

(12) United States Patent
Furukawa et al.

(10) Patent No.: US 11,920,057 B2
(45) Date of Patent: Mar. 5, 2024

(54) INORGANIC OXIDE PARTICLES COATED WITH SILANE COMPOUND HAVING NITROGEN-CONTAINING RING AND COATING COMPOSITION

(71) Applicant: NISSAN CHEMICAL CORPORATION, Tokyo (JP)

(72) Inventors: Tomoki Furukawa, Funabashi (JP); Masato Yamaguchi, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 467 days.

(21) Appl. No.: 16/769,512

(22) PCT Filed: Dec. 10, 2018

(86) PCT No.: PCT/JP2018/045326
§ 371 (c)(1),
(2) Date: Jun. 3, 2020

(87) PCT Pub. No.: WO2019/117086
PCT Pub. Date: Jun. 20, 2019

(65) Prior Publication Data
US 2021/0163756 A1 Jun. 3, 2021

(30) Foreign Application Priority Data

Dec. 11, 2017 (JP) ................................ 2017-237114

(51) Int. Cl.
| | | |
|---|---|---|
| C09D 5/00 | (2006.01) | |
| C09C 1/30 | (2006.01) | |
| C09C 1/36 | (2006.01) | |
| C09C 1/40 | (2006.01) | |
| C09C 3/12 | (2006.01) | |
| C09D 7/40 | (2018.01) | |
| C09D 7/62 | (2018.01) | |
| C09D 183/04 | (2006.01) | |
| G02B 1/04 | (2006.01) | |
| G02B 1/11 | (2015.01) | |
| C08K 3/22 | (2006.01) | |
| C08K 3/34 | (2006.01) | |
| C08K 9/06 | (2006.01) | |

(52) U.S. Cl.
CPC ............ C09D 5/006 (2013.01); C09C 1/3081 (2013.01); C09C 1/3684 (2013.01); C09C 1/407 (2013.01); C09C 3/12 (2013.01); C09D 7/62 (2018.01); C09D 7/67 (2018.01); C09D 183/04 (2013.01); G02B 1/04 (2013.01); G02B 1/11 (2013.01); C01P 2002/50 (2013.01); C01P 2004/64 (2013.01); C08K 2003/2237 (2013.01); C08K 2003/2241 (2013.01); C08K 2003/2244 (2013.01); C08K 2003/343 (2013.01); C08K 9/06 (2013.01); C08K 2201/005 (2013.01); C08K 2201/011 (2013.01)

(58) Field of Classification Search
CPC ........ C09C 1/3081; C09C 1/3684; C09C 3/12
See application file for complete search history.

(56) References Cited

U.S. PATENT DOCUMENTS

| | | | | | |
|---|---|---|---|---|---|
| 5,366,545 | A | * | 11/1994 | Yajima ..................... | C08K 3/22 |
| | | | | | 428/404 |
| 2004/0167257 | A1 | * | 8/2004 | Ryang ..................... | C09C 3/006 |
| | | | | | 524/262 |
| 2012/0316266 | A1 | * | 12/2012 | Koyama ................ | B82Y 30/00 |
| | | | | | 977/773 |
| 2020/0369895 | A1 | * | 11/2020 | Yamaguchi .............. | G02B 1/11 |

FOREIGN PATENT DOCUMENTS

| | | |
|---|---|---|
| JP | S52-016586 A | 2/1977 |
| JP | S53-111336 A | 9/1978 |
| JP | S55-013747 A | 1/1980 |
| JP | S62-151801 A | 7/1987 |
| JP | S63-275682 A | 11/1988 |
| JP | S64-054021 A | 3/1989 |
| JP | H10-306258 A | 11/1998 |
| JP | 2001-123115 A | 5/2001 |
| WO | 2011/090084 A1 | 7/2011 |
| WO | 2012/165620 A1 | 12/2012 |

OTHER PUBLICATIONS

Mar. 12, 2019 International Search Report issued in International Patent Application No. PCT/JP2018/045326.
Mar. 12, 2019 Written Opinion of the International Searching Authority issued in International Patent Application No. PCT/JP2018/045326.
Aug. 27, 2021 Extended Search Report issued in European Patent Application No. 18887855.7.
Aug. 24, 2022 Office Action issued in Chinese Patent Application No. 201880088856.5.
Jan. 4, 2023 Office Action issued in Korean Patent Application No. 10-2020-7018198.

* cited by examiner

*Primary Examiner* — Vickey Nerangis
(74) *Attorney, Agent, or Firm* — Oliff PLC

(57) ABSTRACT

An inorganic oxide particles which have a minute particle diameter at which no interference fringes occur in a coating film and high transparency can be secured even when applied to a high refractive index substrate, and in which excitation by ultraviolet radiation is almost completely suppressed, a coating composition containing such particles, and an optical member having a cured film formed from the coating composition. Inorganic oxide particles obtained by bonding an organosilicon compound having a nitrogen-containing heterocyclic group to the surface of modified metal oxide colloid particles (C) having an average particle diameter of 2 to 100 nm, which include metal oxide colloid particles (A) having an average primary particle diameter of 2 to 60 nm as nuclei and with the nuclei surface coated with a coating composed of inorganic oxide colloid particles (B) having an average primary particle diameter of 1 to 4 nm.

11 Claims, No Drawings

INORGANIC OXIDE PARTICLES COATED WITH SILANE COMPOUND HAVING NITROGEN-CONTAINING RING AND COATING COMPOSITION

TECHNICAL FIELD

The present invention relates to inorganic oxide particles obtained by bonding an organosilicon compound having a nitrogen-containing heterocyclic group thereto, a coating composition containing the inorganic oxide particles, and an optical member having a cured film formed from the coating composition, and specifically, to inorganic oxide particles having a minute particle diameter at which high transparency can be secured, and a coating composition in which a film obtained by coating has excellent hardness, abrasion resistance, adhesion, and transparency and which can form a cured film beneficial as an optical member such as an eyeglass lens, and an optical member.

BACKGROUND ART

Plastic molded products are used in large amounts due to their advantages such as being lightweight, ease of processability, and impact resistance, but they have disadvantages such as being easily scratched due to insufficient hardness, solvents readily penetrating thereinto, adsorbing dust due to charging, and insufficient heat resistance. Therefore, when plastic molded products are used as spectacle lenses, window materials, and the like, they have the above practical disadvantages as compared with inorganic glass molded products. Thus, application of a protective coat (protective coating) to plastic molded products has been proposed. Actually, many types of coating compositions used for protective coats have been proposed.

A coating composition which includes an organosilicon compound or its hydrolyzate as a main component (a resin component or a coating film forming component) has been used for spectacle lenses to provide a hard coating similar to an inorganic type (Patent Document 1).

Since the coating composition still has unsatisfactory abrasion resistance, a composition obtained by additionally adding a silicon dioxide sol dispersed in a colloid form thereto has been proposed, and has also been put into practical use for spectacle lenses (Patent Document 2).

Incidentally, most of conventional plastic spectacle lenses have been produced by cast polymerization of diethylene glycol bisallyl carbonate. However, since these lenses have a refractive index of about 1.50, which is lower than a refractive index of about 1.52 of a glass lens, in the case of myopic lenses, there is a disadvantage that the thickness of the edge becomes thicker. Therefore, in recent years, the development of monomers having a higher refractive index than diethylene glycol bisallyl carbonate has been progressed and high refractive index resin materials have been proposed (Patent Documents 3 and 4).

Methods in which a colloid dispersing element of Sb or Ti metal oxide fine particles is used in a coating material for such high refractive index resin lenses have been proposed (Patent Documents 5 and 6).

In addition, a coating composition which includes a silane coupling agent and particles (C) which include metal oxide colloid particles (A) having a primary particle diameter of 2 to 60 nm as nuclei and with the nuclei surface coated with a coating (B) composed of acidic oxide colloid particles, in which a proportion of (C) contained is 2 to 50% by mass in terms of metal oxides, and which is composed of a stable modified metal oxide sol having a primary particle diameter of 2 to 100 nm has been disclosed. In addition, regarding specific examples of colloid particles used, modified titanium oxide-zirconium oxide-stannic oxide composite colloids coated with alkylamine-containing antimony pentoxide have been disclosed (Patent Document 7). In addition, titanium oxide-stannic oxide-zirconium oxide composite colloids stabilized with an alkylamine or oxycarboxylic acid have been disclosed (Patent Document 8).

PRIOR ART DOCUMENTS

Patent Documents

Patent Document 1: Japanese Unexamined Patent Application Publication No. 52-16586
Patent Document 2: Japanese Unexamined Patent Application Publication No. S53-111336
Patent Document 3: Japanese Unexamined Patent Application Publication No. S55-13747
Patent Document 4: Japanese Unexamined Patent Application Publication No. S64-54021
Patent Document 5: Japanese Unexamined Patent Application Publication No. S62-151801
Patent Document 6: Japanese Unexamined Patent Application Publication No. S63-275682
Patent Document 7: Japanese Unexamined Patent Application Publication No. 2001-123115
Patent Document 8: Japanese Unexamined Patent Application Publication No. H10-306258

SUMMARY OF THE INVENTION

Problem to be Solved by the Invention

The coating compositions to which a silicon dioxide sol is added that have been proposed have problems that interference fringes occur in the coating film and lenses have poor appearances.

In addition, in the case of a coating composition using a titanium oxide sol, there is a problem in compatibility of the titanium oxide sol with a silane coupling agent or its hydrolyzate, and the stability is poor, and also there is a problem that a coating layer (cured film) formed of the coating composition becomes blue colored because titanium oxide is photoexcited due to ultraviolet radiation. In addition, the high refractive index resin lenses have problems such as poor adhesion to the coating composition and peeling off of the film.

An object of the present invention is to provide inorganic oxide particles which have a minute particle diameter at which no interference fringes occur in a coating film and high transparency can be secured even when applied to a high refractive index plastic molded product having a refractive index $n_D$ of 1.58 to 1.76, and in which excitation by ultraviolet radiation is almost completely suppressed, a coating composition containing such particles, and an optical member having a cured film formed from the coating composition.

The inventors have conducted extensive studies in order to address the above problems, and as a result, found that, when a structure in which an organosilicon compound having a nitrogen-containing heterocyclic group having a specific structure is bonded to particle surfaces of inorganic oxide particles is formed, it is possible to form a cured film having not only high transparency and abrasion resistance but also excellent hardness and adhesion when the particles are mixed into a coating composition, and completed the present invention.

That is, a first aspect of the present invention relates to inorganic oxide particles obtained by bonding an organosilicon compound having a nitrogen-containing heterocyclic group to the surface of modified metal oxide colloid particles (C) having an average particle diameter of 2 to 100 nm, which include metal oxide colloid particles (A) having an average primary particle diameter of 2 to 60 nm as nuclei and with the nuclei surface coated with a coating composed of inorganic oxide colloid particles (B) having an average primary particle diameter of 1 to 4 nm.

A second aspect relates to the inorganic oxide particles according to the first aspect, wherein the amount of the organosilicon compound having a nitrogen-containing heterocyclic group is 0.1 to 6.0% by mass based on 100% by mass of a total amount of metal oxides and inorganic oxides of the modified metal oxide colloid particles (C).

A third aspect relates to the inorganic oxide particles according to the first aspect or the second aspect, wherein the organosilicon compound having a nitrogen-containing heterocyclic group is an organosilicon compound having a nitrogen-containing heterocyclic group containing 1 to 3 nitrogen atoms.

A fourth aspect relates to the inorganic oxide particles according to the third aspect, wherein the organosilicon compound having a nitrogen-containing heterocyclic group is an organosilicon compound having a nitrogen-containing heterocyclic group which contains 1 to 3 nitrogen atoms and has 5 to 30 ring-forming atoms. A fifth aspect relates to the inorganic oxide particles according to any one of the first aspect to the third aspect, wherein the organosilicon compound having a nitrogen-containing heterocyclic group is a compound of the following Formula (III):

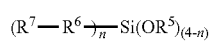   Formula (III)

(in Formula (III),
$R^5$ is a $C_{1-8}$ alkyl group, alkoxyalkyl group, or acyl group,
$R^6$ is a methylene group or a $C_{2-20}$ alkylene group,
$R^7$ is a nitrogen-containing heterocyclic group containing 1 to 3 nitrogen atoms, and
n is an integer of 1 to 3).

A sixth aspect relates to the inorganic oxide particles according to the fifth aspect, wherein $R^7$ is a nitrogen-containing heterocyclic group which contains 1 to 3 nitrogen atoms and has 5 to 30 ring-forming atoms.

A seventh aspect relates to the inorganic oxide particles according to any one of the first aspect to the sixth aspect, wherein a nitrogen-containing heterocycle in the nitrogen-containing heterocyclic group is a pyrrole ring, a pyrrolidone ring, an indole ring, an indoline ring, a carbazole ring, a pyridine ring, a piperidine ring, a pyrimidine ring, a quinoline ring, a pyrazole ring, an imidazole ring, an imidazoline ring, an imidazolidine ring, a benzimidazole ring, a triazole ring, a benzotriazole ring, or a triazine ring.

An eighth aspect relates to the inorganic oxide particles according to any one of the first aspect to the seventh aspect, wherein the metal oxide colloid particles (A) are colloid particles of an oxide of at least one metal selected from the group consisting of Ti, Fe, Cu, Zn, Y, Zr, Nb, Mo, In, Sn, Sb, Ta, W, Pb, Bi and Ce.

A ninth aspect relates to the inorganic oxide particles according to any one of the first aspect to the eighth aspect, wherein the inorganic oxide colloid particles (B) are colloid particles of an oxide of at least one atom selected from the group consisting of Si, Al, Sn, Zr, Mo, Sb and W and are colloid particles different from the metal oxide colloid particles (A).

A tenth aspect relates to the inorganic oxide particles according to any one of the first aspect to the ninth aspect, wherein the modified metal oxide colloid particles (C) are modified metal oxide colloid particles (C) in which one or more intermediate thin film layers formed of any one of a single oxide of at least one atom selected from the group consisting of Si, Al, Sn, Zr, Sb, Nb, Ta and W, a composite oxide of two or more atoms selected from the same group, or a mixture of the single oxide and the composite oxide are interposed between the metal oxide colloid particles (A) serving as nuclei and the inorganic oxide colloid particles (B) serving as a coating.

An eleventh aspect relates to an inorganic oxide aqueous sol or an inorganic oxide organic solvent sol in which the inorganic oxide particles according to any one of the first aspect to the tenth aspect are dispersed in an aqueous medium or an organic solvent.

A twelfth aspect relates to a coating composition, comprising:
a component (S): an organosilicon compound and/or a silicon-containing substance which is a hydrolyzate thereof; and
a component (T): the inorganic oxide particles according to any one of the first aspect to the tenth aspect,
wherein the organosilicon compound of the component (S) includes at least one organosilicon compound selected from the group consisting of the following compound of Formula (I) and the following compound of Formula (II):

   (I)

(wherein,
$R^1$ and $R^3$ are each independently an alkyl group, an aryl group, a halogenated alkyl group, a halogenated aryl group or an alkenyl group, or
an organic group which is a monovalent organic group having an epoxy group, an isocyanate group, an acryloyl group, a methacryloyl group, a mercapto group, a ureido group, an amino group or a cyano group and which is bonded to a silicon atom via an Si—C bond,
$R^2$ is a $C_{1-8}$ alkyl group, aryl group, aralkyl group, alkoxyalkyl group, or acyl group, and
a and b are each independently an integer of 0, 1, or 2, and a+b is an integer of 0, 1, or 2)

   (II)

(wherein,
$R^4$ is a $C_{1-5}$ alkyl group,
X is a $C_{1-4}$ alkyl group or acyl group,
Y is a methylene group or a $C_{2-20}$ alkylene group, and
c is an integer of 0 or 1).

A thirteenth aspect relates to the coating composition according to the twelfth aspect, wherein a mass proportion of the component (S) contained is 25 to 400 parts by mass with respect to 100 parts by mass of the inorganic oxide particles of the component (T).

A fourteenth aspect relates to a coating composition comprising a component (K): at least one resin selected from the group consisting of a thermosetting resin, a thermoplastic resin and a UV curable resin; and a component (T): the inorganic oxide particles according to any one of the first aspect to the tenth aspect.

A fifteenth aspect relates to the coating composition according to the fourteenth aspect, wherein a mass proportion of the component (K) contained is 20 to 400 parts by mass with respect to 100 parts by mass of the inorganic oxide particles of the component (T).

A sixteenth aspect relates to an optical member having a cured film formed from the coating composition according to any one of the twelfth aspect to the fifteenth aspect on the surface of an optical substrate.

A seventeenth aspect relates to the optical member according to the sixteenth aspect, characterized by further comprising an anti-reflective coating on the surface of the cured film formed on the surface of the optical substrate.

Effects of the Invention

The inorganic oxide particles of the present invention have high transparency due to their minute particle diameters, and when they are mixed into a coating composition, the composition can form a cured film having excellent adhesion to a substrate (base material), and excellent hardness, abrasion resistance, and transparency. In addition, the coating composition of the present invention can form a cured film having excellent hardness, abrasion resistance, adhesion and transparency, and particularly form a coating layer having excellent adhesion to a highly refractive resin lens.

The optical member of the present invention has excellent abrasion resistance, surface hardness, and transparency and excellent adhesion between a cured film which is a cured product of the coating composition and a substrate (base material), and even when a high refractive index member having a refractive index of 1.58 or more is used, an optical member having high transparency and a favorable appearance without observable interference fringes can be obtained.

Therefore, the optical member having a cured film produced from a coating composition containing inorganic oxide particles of the present invention can be used for camera lenses, vehicle window glasses, and optical filters attached to liquid crystal displays or plasma displays in addition to spectacle lenses.

MODES FOR CARRYING OUT THE INVENTION

[Inorganic Oxide Particles]

Inorganic oxide particles of the present invention are inorganic oxide particles obtained by bonding an organosilicon compound having a nitrogen-containing heterocyclic group to the surface of modified metal oxide colloid particles (C) having an average particle diameter of 2 to 100 nm.

<<Modified Metal Oxide Colloid Particles (C)>>

The modified metal oxide colloid particles (C) are colloid particles which include metal oxide colloid particles (A) having an average primary particle diameter of 2 to 60 nm as nuclei and with the nuclei surface coated with a coating composed of inorganic oxide colloid particles (B) having an average primary particle diameter of 1 to 4 nm.

In the present invention, the average primary particle diameters of the metal oxide colloid particles (A) serving as nuclei, and the inorganic oxide colloid particles (B) serving as a coating are measured by observation using a transmission electron microscope. The average particle diameter of the modified metal oxide colloid particles (C) in which the surface of the particles (A) serving as the nuclei is coated with a coating composed of the particles (B) can be measured by a dynamic light scattering method (DLS method).

Here, when the surface of the metal oxide colloid particles (A) is coated with the inorganic oxide colloid particles (B), the value of the particle diameter of the obtained modified metal oxide colloid particles (C) can vary due to a reaction at the interface between the particles. Therefore, when the particle diameter of the modified metal oxide colloid particles (C) is evaluated according to the primary particle diameter measured by observation using a transmission electron microscope, the value may not always match the sum of average primary particle diameters of the metal oxide colloid particles (A) and the inorganic oxide colloid particles (B).

Hereinafter, in this specification, the particle diameter measured by observation using a transmission electron microscope will be referred to as an "average primary particle diameter" and the particle diameter measured by a dynamic light scattering method (DLS method) will be referred to as an "average particle diameter (dynamic light scattering method particle diameter)."

<Metal Oxide Colloid Particles (A)>

The metal oxide colloid particles (A) are particles having an average primary particle diameter of 2 to 60 nm.

Examples of such metal oxide colloid particles (A) include colloid particles of an oxide of at least one metal selected from the group consisting of Ti, Fe, Cu, Zn, Y, Zr, Nb, Mo, In, Sn, Sb, Ta, W, Pb, Bi and Ce. The metal oxide colloid particles (A) are colloid particles of an oxide of a metal having a valence of 2 to 6, and examples of forms of such a metal oxide include $TiO_2$, $Fe_2O_3$, $CuO$, $ZnO$, $Y_2O_3$, $ZrO_2$, $Nb_2O_5$, $MoO_3$, $In_2O_3$, $SnO_2$, $Sb_2O_5$, $Ta_2O_5$, $WO_3$, $PbO$, $Bi_2O_3$, and $CeO_2$. Here, these metal oxides may be used alone or a plurality of types thereof may be used in combination. Examples of a combining method include a method of mixing several types of the above metal oxides, a method of compositing the above metal oxides, and a method of converting the above metal oxides into a solid solution at an atomic level.

When the metal oxide colloid particles (A) are composed of a plurality of types of metal oxides, examples thereof include $TiO_2$—$SnO_2$ composite oxide colloid particles in which $TiO_2$ particles and $SnO_2$ particles are chemically bonded at their interfaces to form a composite, $SnO_2$—$WO_3$ composite oxide colloid particles in which $SnO_2$ particles and $WO_3$ particles are chemically bonded at their interfaces to form a composite, $SnO_2$—$ZrO_2$ composite colloid particles in which $SnO_2$ particles and $ZrO_2$ particles are chemically bonded at their interfaces to form a composite, and $TiO_2$—$ZrO_2$—$SnO_2$ composite oxide colloid particles obtained by forming a solid solution of $TiO_2$, $ZrO_2$, and $SnO_2$ at an atomic level.

In addition, the metal oxide colloid particles (A) can be used as a compound as a combination of metal components, and examples thereof include $ZnSb_2O_6$, $InSbO_4$, and $ZnSnO_3$.

The metal oxide colloid particles (A) can be produced by a known method, for example, an ion exchange method, a peptization method, a hydrolysis method, or a reaction method. Examples of ion exchange methods include a method of treating an acidic salt of the metal with a hydrogen type ion exchange resin and a method of treating a basic salt of the metal with a hydroxyl group type anion exchange resin. Examples of peptization methods include a method in which a gel obtained by neutralizing an acidic salt of the metal with a base or neutralizing a basic salt of the metal with an acid is washed and then peptized with an acid or abase. Examples of hydrolysis methods include a method of hydrolyzing an alkoxide of the metal and a method in which a basic salt of the metal is hydrolyzed while heating and unnecessary acid is then removed. Examples of reaction methods include a method of reacting the metal powder with an acid.

Here, when the metal oxide colloid particles (A) contain titanium oxide, the particles may be amorphous or anatase type, rutile type, or brookite type crystals, for example. In addition, a perovskite type titanium compound such as barium titanate ($BaTiO_3$ or $BaO·TiO_2$) may be used. In particular, the crystal type of colloid particles of a composite oxide containing titanium oxide as a main component is preferably a rutile type.

In the metal oxide colloid particles (A), when the content of titanium oxide is set to 50% by mass or more, an improvement in the refractive index in a cured film obtained using a composition containing these particles can be expected, and a reduction in the generation of interference fringes that can occur due to a refractive index of a substrate can be expected.

<Inorganic Oxide Colloid Particles (B)>

The inorganic oxide colloid particles (B) are particles having an average primary particle diameter of 1 to 4 nm.

Examples of such inorganic oxide colloid particles (B) include colloid particles of an oxide of one or two or more atoms selected from the group consisting of Si, Al, Sn, Zr, Mo, Sb and W, but the colloid particles are different from the metal oxide colloid particles (A).

Examples of forms of an oxide (inorganic oxide) of the atoms may include $SiO_2$, $Al_2O_3$, $SnO_2$, $ZrO_2$, $MoO_3$, $Sb_2O_5$, and $WO_3$.

Here, these inorganic oxides may be used alone or in combination. Examples of a combining method include a method of mixing several types of the above inorganic oxides, a method of compositing the above inorganic oxides, and a method of converting the above inorganic oxide into a solid solution at an atomic level.

When the inorganic oxide colloid particles (B) are composed of a plurality of types of oxides, examples thereof include $SnO_2$—$WO_3$ composite colloid particles in which $SnO_2$ particles and $WO_3$ particles are chemically bonded at their interfaces to form a composite, $SnO_2$—$SiO_2$ composite colloid particles in which $SnO_2$ particles and $SiO_2$ particles are chemically bonded at their interfaces to form a composite, $SnO_2$—$WO_3$—$SiO_2$ composite colloid particles, in which $SnO_2$ particles, $WO_3$ particles, and $SiO_2$ particles are chemically bonded at their interfaces to form a composite, $SnO_2$—$MoO_3$—$SiO_2$ composite colloid particles in which $SnO_2$ particles, $MoO_3$ particles, and $SiO_2$ particles are chemically bonded at their interfaces to form a composite, and $Sb_2O_5$—$SiO_2$ composite colloid particles in which $Sb_2O_5$ particles and $SiO_2$ particles are chemically bonded at their interfaces to form a composite.

The inorganic oxide colloid particles (B) can be produced by a known method, for example, an ion exchange method or an oxidation method. Examples of ion exchange methods include a method of treating an acidic salt of the atom with a hydrogen type ion exchange resin. Examples of oxidation methods include a method of reacting an atomic or inorganic oxide powder with hydrogen peroxide.

<Modified Metal Oxide Colloid Particles (C)>

In the modified metal oxide colloid particles (C) (inorganic oxide colloid particle coating-metal oxide colloid particles) which include the metal oxide colloid particles (A) as nuclei and with the nuclei surface coated with a coating composed of the inorganic oxide colloid particles (B), the amount (mass ratio) of the inorganic oxide colloid particles (B) serving as a coating is preferably in a range of 0.01 to 1.0 with respect to the metal oxide colloid particles (A) serving as nuclei.

Here, the value of the average primary particle diameter of the inorganic oxide colloid particles (B) is preferably smaller than the value of the average primary particle diameter of the metal oxide colloid particles (A). It is thought that, in the modified metal oxide colloid particles (C), the surfaces of the metal oxide colloid particles (A) are coated with the inorganic oxide colloid particles (B) due to an electrostatic interaction. When an intermediate thin film layer (to be described below) is formed between the metal oxide colloid particles (A) and the inorganic oxide colloid particles (B), the intermediate thin film layer can cover the surfaces of the metal oxide colloid particles (A) in a solution state. Preferably, the metal oxide colloid particles (A) and the inorganic oxide colloid particles (B), and additionally, respective layers including the intermediate thin film layer have different compositions (components) of metal oxides.

In order to obtain colloid particles, that is, the modified metal oxide colloid particles (C) which include the metal oxide colloid particles (A) as nuclei and with the nuclei surface coated with a coating composed of the inorganic oxide colloid particles (B), a conventionally known method can be used.

For example, a method in which an aqueous sol containing the metal oxide colloid particles (A) serving as nuclei and an aqueous sol containing the inorganic oxide colloid particles (B) serving as a coating are mixed at a mass ratio (B)/(A) of 0.01 to 1.0 in terms of their metal oxides and inorganic oxides, and this aqueous medium is then heated may be exemplified.

The mixing of the metal oxide colloid particles (A) and the inorganic oxide colloid particles (B) can be performed at a temperature of 0 to 100° C., preferably at room temperature to 60° C. Then, heating after the mixing is performed, for example, at 70 to 300° C.

The modified metal oxide colloid particles (C) obtained in the procedure are obtained in the form of an aqueous sol of the modified metal oxide colloid particles (C), and can be used for preparing inorganic oxide particles obtained by bonding an organosilicon compound having a nitrogen-containing heterocyclic group (to be described below) thereto in the form of the aqueous sol or an organic solvent sol (organosol) in which an aqueous medium of the sol (to be described below) is substituted with an organic solvent.

<Intermediate Thin Film Layer>

In the modified metal oxide colloid particles (C), one or more intermediate thin film layers formed of any one of a single oxide of at least one atom selected from the group consisting of Si, Al, Sn, Zr, Sb, Nb, Ta and W, a composite oxide of two or more atoms selected from the same group, and a mixture of the single oxide and the composite oxide may be interposed between the metal oxide colloid particles (A) serving as nuclei and the coating composed of the inorganic oxide colloid particles (B) covering the surfaces thereof. The intermediate thin film layer may be a single layer or multiple layers (two or more layers).

When at least one intermediate thin film layer is interposed between the metal oxide colloid particles (A) serving as nuclei and the inorganic oxide colloid particles (B) serving as a coating, it is possible to adjust a refractive index of the modified metal oxide colloid particles (C) and also an improvement in light resistance and weather resistance of a coating obtained using a coating composition containing the colloid particles (C) can be expected and it is possible to improve various physical properties such as adhesion between the coating and the substrate. In addition, coloring of the modified metal oxide colloid particles (C) is suppressed and it is possible to improve transparency of the coating.

In addition, the number of intermediate thin film layers, and the thickness of the layer are not particularly limited as long as the amount (mass ratio) of the inorganic oxide colloid particles (B) serving as a coating with respect to the metal oxide colloid particles (A) serving as nuclei described above is in a range of 0.01 to 1.0.

In addition, particularly, the intermediate thin film layer is suitably made of at least one of silicon dioxide ($SiO_2$), antimony oxide ($Sb_2O_5$), aluminum oxide ($Al_2O_3$) and zirconium oxide ($ZrO_2$), and for example, silicon dioxide, antimony oxide, aluminum oxide or zirconium oxide may be laminated by each component to form a thin film layer, or may be combined into, for example, an antimony oxide-silicon dioxide complex, to form a thin film layer.

As an example, when silicon dioxide is included as an oxide constituting the intermediate thin film layer, it is possible to improve the stability of the sol of the modified metal oxide colloid particles (C) and it is possible to prolong the pot life of the coating composition to be described below. Therefore, it is possible to improve the hardness of a transparent film (cured film) obtained from the coating composition, it is possible to improve adhesion to an anti-reflective coating formed on the transparent film (cured film), and it is possible to improve weather resistance, light resistance, adhesion to the substrate, film hardness, abrasion resistance, flexibility, and the like. For example, when silicon dioxide, zirconium oxide and/or aluminum oxide are used for the intermediate thin film layer, it is possible to obtain modified metal oxide colloid particles (C) that can form a transparent film (cured film) having excellent weather resistance, light resistance, adhesion to the substrate, film hardness, abrasion resistance, flexibility, and the like.

In addition, when zirconium oxide is used as an oxide constituting the intermediate thin film layer, discoloration of the obtained modified oxide colloid particles (C) can be suppressed. This has a problem that titanium oxide (titanium oxide sol) having a small average primary particle diameter causes a reaction in which titanium oxide is partially reduced from $TiO_2$ to TiO due to ultraviolet radiation, and dark blue is exhibited as described above. Also in the case of stannic oxide ($SnO_2$), it has a problem that, when it is used as a sol having an average primary particle diameter of 100 nm or less, and particularly 30 nm or less, since a reaction in which $SnO_2$ is partially reduced to SnO is caused due to ultraviolet radiation, brown or blue-green is exhibited. In this case, when zirconium oxide is present in the intermediate thin film layer of the modified oxide colloid particles (C), reduction of titanium oxide or stannic oxide constituting oxide colloid particles to TiO or SnO can be suppressed, and discoloration can be suppressed.

When an intermediate thin film layer is interposed, first, an aqueous solution or colloid particle dispersion solution of atoms as a component constituting the intermediate thin film layer is prepared, the metal oxide colloid particles (A) are put thereinto, and the intermediate thin film layer is formed on the surface of the metal oxide colloid particles (A). When the intermediate thin film layer is formed, heating is preferably performed, and the temperature is preferably 40° C. or higher, or 200° C. or lower.

Next, an aqueous sol of the inorganic oxide colloid particles (B) may be added to an aqueous sol of the metal oxide colloid particles (A) on which the intermediate thin film layer has been formed to form a coating layer by the above method. As described above, the amount of the inorganic oxide colloid particles (B) added is in a range of 0.01 to 1.0 (mass ratio) with respect to the metal oxide colloid particles (A).

<Sol of Modified Metal Oxide Colloid Particles (C)>

The modified metal oxide colloid particles (C) in the form of an aqueous sol, which are obtained by the above method and in which the metal oxide colloid particles (A) are coated with the inorganic oxide colloid particles (B) may be subjected to a washing treatment as necessary to remove impurities. In addition, a total metal oxide concentration in the aqueous sol can be adjusted by a method such as ultrafiltration and evaporative concentration, and the pH and temperature of the aqueous sol can be appropriately adjusted. In addition, as necessary, heating may be performed at, for example, 40° C. to 200° C. Here, in this specification, the "total metal oxide concentration" in the colloid particles (C) is defined as a concentration of oxides such as $TiO_2$, $SnO_2$, $ZrO_2$, and the like contained in the colloid particles (A) and the colloid particles (B), and a concentration of oxides also including $SiO_2$ when the colloid particles (B) contain $SiO_2$.

When it is desired to further increase the concentration of the aqueous sol, concentration can be performed by a general method, for example, an evaporation method or an ultrafiltration method, to a maximum of about 50% by mass. In addition, when it is desired to adjust the pH of the sol, adjustment can be performed by adding an alkali metal, organic base (amine), oxycarboxylic acid, or the like (to be described below) to the sol after concentration.

In particular, a sol in which the total concentration of metal oxides (total metal oxide concentration) is 10 to 40% by mass is practically preferable.

In the aqueous sol of the modified metal oxide colloid particles (C), water as a dispersion medium for the aqueous sol is substituted with a hydrophilic organic solvent, and thus an organic solvent sol (organic solvent dispersion sol, organosol) is obtained. This replacement can be performed by a conventional method such as a distillation method and an ultrafiltration method. Examples of hydrophilic organic solvents include lower alcohols such as methyl alcohol, ethyl alcohol, and isopropyl alcohol, ethers such as propylene glycol monomethyl ether, and propylene glycol monoethyl ether, linear amides such as dimethylformamide, and N,N'-dimethylacetamide, cyclic amides such as N-methyl-2-pyrrolidone, and glycols such as ethyl cellosolve and ethylene glycol.

Here, the sol of the modified metal oxide colloid particles (C) can contain other optional components as long as the object of the present invention is achieved. In particular, when a proportion of oxycarboxylic acids contained is about 30% by mass or less with respect to a total amount of all metal oxides, the resulting colloids have further improved performance of dispersibility, or the like. Examples of oxycarboxylic acids used include lactic acid, tartaric acid, citric acid, gluconic acid, malic acid, and glycolic acid.

In addition, the sol of the modified metal oxide colloid particles (C) can contain an alkali component, and examples thereof include hydroxides of alkali metals, such as Li, Na, K, Rb, and Cs; and organic bases such as alkylamines such as ammonia, ethylamine, triethylamine, isopropylamine, and n-propylamine, aralkylamines such as benzylamine, alicyclic amines such as piperidine, and alkanolamines such as monoethanolamine and triethanolamine. These can be contained as a mixture of two or more thereof. A proportion of these contained can be about 30% by mass or less with respect to a total amount of all metal oxides. In addition, they can be used in combination with the above oxycarboxylic acid.

<<Organosilicon Compound Having Nitrogen-Containing Heterocyclic Group>>

The inorganic oxide particles of the present invention are obtained by bonding an organosilicon compound having a nitrogen-containing heterocyclic group to at least a part of the surface of the above modified metal oxide colloid particles (C).

The organosilicon compound having a nitrogen-containing heterocyclic group is preferably an organosilicon compound having a nitrogen-containing heterocyclic group containing 1 to 3 nitrogen atoms, and particularly, it is preferably a compound of the following Formula (III):

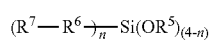
Formula (III)

(in Formula (III), $R^5$ is a $C_{1-8}$ alkyl group, alkoxyalkyl group, or acyl group, $R^6$ is a methylene group or a $C_{2-20}$ alkylene group, $R^7$ is a nitrogen-containing heterocyclic group containing 1 to 3 nitrogen atoms, and n is an integer of 1 to 3).

In the above, the nitrogen-containing heterocyclic group containing 1 to 3 nitrogen atoms is preferably a nitrogen-containing heterocyclic group which contains 1 to 3 nitrogen atoms and has 5 to 30 ring-forming atoms, and more preferably a nitrogen-containing heterocyclic group which has 5 to 10 ring-forming atoms, and particularly, 5 to 8 ring-forming atoms. Here, the number of ring-forming atoms refer to the number of atoms constituting the ring itself of a compound (for example, a single ring compound, a fused ring compound, a crosslinked compound, a carbocyclic compound, or a heterocyclic compound) with a structure in which atoms are bonded in a ring shape (for example, a single ring, a fused ring, or a ring assembly), and atoms that do not form a ring (for example, hydrogen atoms terminating a bond of atoms that form a ring) and atoms included in a substituent when the ring is substituted with substituents are not included in the number of ring-forming atoms.

Examples of nitrogen-containing heterocycles in the nitrogen-containing heterocyclic group include a pyrrole ring, a pyrrolidone ring, an indole ring, an indoline ring, a carbazole ring, a pyridine ring, a piperidine ring, a pyrimidine ring, a quinoline ring, a pyrazole ring, an imidazole ring, an imidazoline ring, an imidazolidine ring, a benzimidazole ring, a triazole ring, a benzotriazole ring, and a triazine ring.

Examples of "nitrogen-containing heterocyclic group containing 1 to 3 nitrogen atoms" in the definition of $R^7$ in Formula (III) include a monovalent group derived from the above-mentioned nitrogen-containing heterocycle.

$R^6$ is preferably a $C_{2-10}$ alkylene group, that is, an alkylene group having 2, 3, 4, 5, 6, 7, 8, 9 or 10 carbon atoms.

In addition, examples of a preferable nitrogen-containing heterocyclic group for $R^7$ include a benzimidazole group and a benzotriazolyl group.

In addition, n is preferably 1.

<<Inorganic Oxide Particles Obtained by Bonding Organosilicon Compound Having Nitrogen-Containing Heterocyclic Group to Surface of Modified Metal Oxide Colloid Particles (C)>>

As described above, the inorganic oxide particles of the present invention have a structure in which an organosilicon compound having a nitrogen-containing heterocyclic group is bonded to the surface of the modified metal oxide colloid particles (C). More specifically, the inorganic oxide particles have a structure in which an alkoxy group and an acyloxy group which are hydrolyzable groups in the organosilicon compound having a nitrogen-containing heterocyclic group are bonded to hydroxy groups derived from the inorganic oxide colloid particles (B) serving as a coating in the modified metal oxide colloid particles (C).

In order for the organosilicon compound having a nitrogen-containing heterocyclic group to be bonded to the surface of the modified metal oxide colloid particles (C), for example, predetermined amounts of the colloid particles (C) (for example, an alcohol dispersion sol of the colloid particles (C)) and the organosilicon compound having a nitrogen-containing heterocyclic group (or its alcohol solution) are mixed, (if necessary) a predetermined amount of water, as necessary, a hydrolysis catalyst such as dilute hydrochloric acid is added thereto, and the mixture is then left for a predetermined time at room temperature or may be heated.

The organosilicon compounds having a nitrogen-containing heterocyclic group bonded to the surface of the modified metal oxide colloid particles (C) may be used alone or two or more thereof may be used in combination.

In addition, when a surface modification treatment in which the organosilicon compound having a nitrogen-containing heterocyclic group is bonded to the surface of the modified metal oxide colloid particles (C) is performed, the organosilicon compound having a nitrogen-containing heterocyclic group may be partially hydrolyzed in advance, or the surface modification treatment may be performed without performing hydrolysis.

In addition, after the surface modification treatment, a state in which hydrolyzable groups of the organosilicon compound having a nitrogen-containing heterocyclic group have reacted with hydroxy groups on the surface of the modified metal oxide colloid particles (C) is preferable, and there is no problem even if some hydroxy groups are left untreated.

In addition, the amount of the organosilicon compound having a nitrogen-containing heterocyclic group bonded to the surface of the metal oxide colloid particles (C) is not particularly limited, but is, for example, 0.01 to 20% by mass, for example, 0.1 to 10% by mass, and preferably 0.1 to 6% by mass with respect to a total mass (100% by mass) of all metal oxides (that is, metal oxides and inorganic oxides) of the metal oxide colloid particles (C).

The inorganic oxide particles obtained by bonding the organosilicon compound having a nitrogen-containing heterocyclic group to the surface of the modified metal oxide colloid particles (C) obtained in the above procedure are obtained in a form of a sol of inorganic oxide particles, and an inorganic oxide aqueous sol in which the inorganic oxide particles are dispersed in an aqueous medium and an inorganic oxide organic solvent sol in which the inorganic oxide particles are dispersed in an organic solvent are also an object of the present invention, and the particles in such a sol form can be suitably used for the coating composition to be described below.

[Coating Composition]

The coating composition of the present invention (also referred to as a coating solution) comprises a component (S): an organosilicon compound and/or a silicon-containing substance which is a hydrolyzate thereof, and a component (T): the above inorganic oxide particles.

Alternatively, the coating composition of the present invention comprises a component (K): at least one resin selected from the group consisting of a thermosetting resin, a thermoplastic resin and a UV curable resin, and a component (T): the above inorganic oxide particles.

Hereinafter, components constituting the coating composition of the present invention, particularly, the component (S) and the component (K) will be described in detail.

<<Component (S)>>

The component (S) according to the present invention is an organosilicon compound, and/or a silicon-containing substance which is a hydrolyzate thereof. Specifically, the organosilicon compound includes at least one organosilicon compound selected from the group consisting of compounds of Formula (I) and compounds of Formula (II) to be described below.

<Compound of Formula (I)>

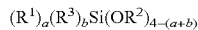

$(R^1)_a(R^3)_b Si(OR^2)_{4-(a+b)}$ (I)

wherein, $R^1$ and $R^3$ are each independently an alkyl group, an aryl group, a halogenated alkyl group, a halogenated aryl group or an alkenyl group, or an organic group which is a monovalent organic group having an epoxy group, an isocyanate group, an acryloyl group, a methacryloyl group, a mercapto group, a ureido group, an amino group or a cyano group and which is bonded to a silicon atom via an Si—C bond, $R^2$ is a $C_{1-8}$ alkyl group, aryl group, aralkyl group, alkoxyalkyl group, or acyl group, a and b are each independently an integer of 0, 1, or 2, and a+b is an integer of 0, 1, or 2.

The organosilicon compound of Formula (I) includes an organosilicon compound in which $R^1$ and $R^3$ are the same organic group or different organic groups and an organosilicon compound in which a and b are the same integer or different integers.

Examples of organosilicon compounds of Formula (I) include tetramethoxysilane, tetraethoxysilane, tetra n-propoxysilane, tetraisopropoxysilane, tetra n-butoxysilane, tetraacetoxysilane, methyltrimethoxysilane, methyltripropoxysilane, methyltributoxysilane, methyltriacetoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltrimethoxysilane, γ-glycidoxybutyltriethoxysilane, δ-glycidoxybutyltrimethoxysilane, δ-glycidoxybutyltrimethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, isocyanate propyltriethoxysilane, ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)γ-aminopropyltrimethoxysilane, N-(β-aminoethyl)γ-aminopropylmethyldimethoxysilane, γ-aminopropylmethyldimethoxysilane, 3-aminopropyltrimethoxysilane, N-(β-aminoethyl)γ-aminopropyltriethoxysilane, N-(β-aminoethyl)γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptomethyldiethoxysilane, 3-ureidopropyltriethoxysilane, ureido methyltrimethoxysilane, 2-ureido ethyltrimethoxysilane, 3-ureido propyltrimethoxysilane, ureido methyltriethoxysilane, 2-ureidoethyltriethoxysilane, 3-ureidopropyltriethoxysilane, methylvinyldimethoxysilane, and methylvinyldiethoxysilane, and these can be used alone or two or more thereof can be used in combination.

<Compound of Formula (II)>

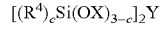

$[(R^4)_c Si(OX)_{3-c}]_2 Y$ (II)

wherein, $R^4$ is a $C_{1-5}$ alkyl group,

X is a $C_{1-4}$ alkyl group or acyl group,

Y is a methylene group or a $C_{2-20}$ alkylene group, and c is an integer of 0 or 1.

Examples of organosilicon compounds of Formula (II) include methylenebismethyldimethoxysilane, ethylenebisethyldimethoxysilane, propylenebisethyldiethoxysilane, and butylene bismethyldiethoxysilane, and these can be used alone or two or more thereof can be used in combination.

The component (S) is preferably an organosilicon compound of Formula (I). In particular, an organosilicon compound of Formula (I) that satisfies conditions in which any of $R^1$ and $R^3$ is an organic group including an epoxy group, $R^2$ is an alkyl group, a and b are each 0 or 1, and a+b is 1 or 2 is preferable.

Preferable examples of organosilicon compounds of Formula (I) include glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, and γ-glycidoxypropylvinyldiethoxysilane. More preferably, γ-glycidoxypropyltrimethoxysilane, γ-glycidoxypropylmethyldimethoxysilane, and γ-glycidoxypropylmethyldiethoxysilane are used.

These can be used alone or as a mixture (and for example, as a mixture with various organosilicon compounds exemplified above).

In addition, when γ-glycidoxypropyltrimethoxysilane, γ-glycidoxypropylmethyldimethoxysilane, or γ-glycidoxypropylmethyldiethoxysilane is used, additionally, a tetrafunctional compound corresponding to a+b=0 in Formula (I) may be used together. Examples of compounds corresponding to four functions include tetramethoxysilane, tetraethoxysilane, tetraisopropoxysilane, tetra n-propoxysilane, tetra n-butoxysilane, tetra tert-butoxysilane, and tetra sec-butoxysilane.

Here, the component (S) used in the coating composition of the present invention: the hydrolyzate of the organosilicon compound is obtained by hydrolyzing the compound of Formula (I) and the compound of Formula (II), and is a compound in which a part or all of $R^2$ (Formula (I)), X(Formula (II)) is substituted with a hydrogen atom. These hydrolyzates of the organosilicon compounds of Formula (I) and Formula (II) can be used alone or two or more thereof can be used in combination. The hydrolysis is performed by adding an acidic aqueous solution such as a hydrochloric acid aqueous solution, a sulfuric acid aqueous solution, and an acetic acid aqueous solution to the organosilicon compound and stirring the mixture.

<<Coating Composition Containing Component (S) and Component (T)>>

In the coating composition containing the component (S) and the component (T), the ratio of the component (S) to the component (T) is not particularly limited. For example, a mass proportion of the component (S) contained is 25 to 400 parts by mass with respect to 100 parts by mass of the inorganic oxide particles of the component (T), and preferably suitably 25 to 300 parts by mass.

<<Component (K)>>

The component (K) according to the present invention is at least one resin selected from the group consisting of a thermosetting resin, a thermoplastic resin and a UV curable resin, and these resins have a role as a matrix forming component.

Regarding the matrix forming component, an acrylic resin, a melamine resin, a urethane resin, a polyester resin, an epoxy resin, a phosphagen resin, and the like are used. Among these, a polyester resin or a urethane resin is preferable.

<<Coating Composition Containing Component (K) and Component (T)>>

In the coating composition containing the component (K) and the component (T), a ratio of the component (K) to the component (T) is not particularly limited. For example, a mass proportion of the component (K) contained is 25 to 400 parts by mass with respect to 100 parts by mass of the inorganic oxide particles of the component (T).

<<Other Components>>

The coating composition of the present invention can contain a curing catalyst (curing agent) for promoting a curing reaction. Examples of curing catalysts (curing agents) include at least one curing catalyst selected from the group consisting of amines, amino acids, metal alkoxide, metal chelate compounds, organic acid metal salts, perchloric acids or salts thereof, acids or salts thereof, and metal chloride.

The curing catalyst (curing agent) is used for promoting curing of a silanol group (or further an epoxy group in some cases) of the organosilicon compound (S) contained in the coating composition. When such a curing catalyst (curing agent) is used, it is possible to accelerate a coating forming reaction.

Specific examples thereof include amines such as ethylamine, n-butylamine, triethylamine, allylamine, guanidine, and biguanizide; amino acids such as glycine; alkoxides of metals such as aluminum, zirconium and titanium; metal chelate compounds such as aluminum acetylacetonate, chromium acetylacetonate, titanium acetylacetonate, and cobalt acetylacetonate; organic acid metal salts such as sodium acetate, zinc naphthenate, cobalt naphthenate, zinc octylate, and tin octylate; perchloric acids such as perchloric acid, ammonium perchlorate, and magnesium perchlorate or salts thereof; inorganic acids or organic acids such as hydrochloric acid, phosphoric acid, nitric acid, chromic acid, hypochlorous acid, boric acid, bromic acid, selenous acid, thiosulfuric acid, orthosilicic acid, thiocyanic acid, nitrous acid, aluminic acid, carbonic acid, organic carboxylic acid, and p-toluenesulfonic acid, or salts thereof; and metal chlorides that are Lewis acids such as $SnCl_2$, $AlCl_3$, $FeCl_3$, $TiCl_4$, $ZnCl_2$, and $SbCl_3$.

Such a curing catalyst (curing agent) of which the type and the amount used can be appropriately adjusted according to, for example, the composition of the coating composition of the present invention, and can be used. When a curing catalyst (curing agent) is used, the upper limit of the amount used is desirably 5% by mass or less with respect to the total solid content in the coating composition. Here, in this specification, "total solid content" refers to all components of the coating composition excluding the solvent, and is treated as "solid content" for convenience also in the case of liquid components.

In addition, in the coating composition of the present invention, in order to impart fluidity, adjust a solid content concentration, and adjust surface tension, viscosity, an evaporation rate, and the like, a solvent may be used. The solvent used is water or an organic solvent.

Examples of organic solvents used include alcohols such as methanol, ethanol, isopropyl alcohol, and butanol, cellosolves such as methyl cellosolve and ethyl cellosolve, glycols such as ethylene glycol, esters such as methyl acetate, ethyl acetate, and butyl acetate, ethers such as diethyl ether, propylene glycol monomethyl ether, propylene glycol monoethyl ether, and tetrahydrofuran, ketones such as acetone and methyl ethyl ketone, halogenated hydrocarbons such as dichloroethane, aromatic hydrocarbons such as toluene and xylene, and N,N-dimethylformamide, N-methyl-2-pyrrolidone, and the like.

Here, the concentration of the total solid content in the coating composition of the present invention can be, for example, 20 to 40% by mass.

In addition, in the coating composition of the present invention, as will be described below, when a cured film from the composition is formed on the substrate, various surfactants can be contained in order to improve wettability with respect to the substrate and improve smoothness of the cured film. In addition, a UV absorber, an antioxidant, an antistatic agent, or the like can be added as long as they do not influence physical properties of the cured film. In addition, a disperse dye, an oil-soluble dye, a fluorescent dye, a pigment, a photochromic compound, a thixotropic agent, or the like may be added.

In addition, various fine particulate metal oxides can be contained in the coating composition of the present invention in order to match the refractive index with the substrate (base material, for example, a lens). Examples of fine particulate metal oxides include fine particles of aluminum oxide, titanium oxide, antimony pentoxide, zirconium oxide, silicon dioxide, and cerium oxide which have an average primary particle diameter of 2 to 60 nm.

[Cured Film and Optical Member]

The coating composition of the present invention can be applied to the surface of the substrate to form a cured film. Here, in addition, when a transparent substrate (optical substrate) suitable for an optical application is used, it is possible to obtain an optical member having a cured film. The optical member is also an object of the present invention.

Regarding the substrate to be used, various substrates made of a glass, a plastic, and the like are used, and specific examples thereof include various optical lenses such as spectacle lenses and cameras, various display element filters, looking glasses, window glasses, coating films for vehicles and the like, and light covers used for vehicles and the like. On the surface of the substrate, a cured film (transparent film) is formed from the coating composition of the present invention as a hard coat film. Here, in addition to applications as a hard coat film, it may be formed as a film for a primer of a plastic lens.

The coating composition can be cured by hot air drying or active energy ray emission. Regarding curing conditions of hot air drying, curing may be performed in hot air at 70 to 200° C. and particularly preferably at 90 to 150° C. In addition, examples of active energy rays include infrared rays, ultraviolet rays, and electron beams, and particularly, far infrared rays can reduce damage due to heat.

Regarding a method of applying the coating composition of the present invention to the surface of the substrate, generally used methods such as a dipping method, a spin method, and a spray method can be applied. Among these, a dipping method and a spin method are particularly preferable in consideration of surface accuracy.

In addition, before the coating composition is applied to the surface of the substrate, the surface of the substrate is subjected to a chemical treatment with an acid, an alkali or various organic solvents, or a detergent, or a physical treatment with plasma, ultraviolet rays or the like, and thus adhesion between the substrate and the cured film can be improved. In addition, when the surface of the substrate is subjected to a primer treatment using various resins, adhesion between the substrate and the cured film can be further improved.

In addition, a cured film formed from the coating composition of the present invention can be used for a reflective film as a high-refractive-index film, and can be used as a multifunctional film by additionally adding functional components such as antifogging, photochromic and antifouling.

An optical member having a cured film formed from the coating composition of the present invention can be used for camera lenses, vehicle window glasses, and optical filters attached to liquid crystal displays or plasma displays in addition to spectacle lenses.

In addition, the optical member of the present invention has a cured film formed from the coating composition of the present invention on the surface of the optical substrate, and an anti-reflective coating formed from a deposition film of an inorganic oxide can be formed on the cured film. The anti-reflective coating is not particularly limited, and a single layer or multi-layer deposition film of a inorganic oxide, which is conventionally known, can be used. Examples of anti-reflective coatings include anti-reflective coatings disclosed in Japanese Unexamined Patent Application Publication No. H2-262104 (JP 2-262104 A) and Japanese Unexamined Patent Application Publication No. S56-116003 (JP 56-116003 A).

EXAMPLES

While the present invention will be described below in more detail with reference to production examples, examples and comparative examples, the present invention is not limited to these examples.

Various physical properties of the dispersion solution were determined by the following measurement methods.

[Specific Gravity] It was determined by a hydrometer method.

[Viscosity] It was determined by an Ostwald viscometer (20° C.).

[Water Content] It was determined by a Karl Fischer titration method.

[Average Particle Diameter Obtained Through Dynamic Light Scattering (Dynamic Light Scattering Method Particle Diameter)] A sol was diluted with a dispersion solvent, and measurement was performed using parameters of the solvent by a dynamic light scattering method measurement device (Zetasizer commercially available from Malvern Instruments Ltd.).

[Average Primary Particle Diameter Determined Using a Transmission Electron Microscope]

A sol was dropped onto a copper mesh and dried and observation was performed using a transmission electron microscope (JEM-1020 commercially available from JEOL Ltd.) at an acceleration voltage of 100 kV, and a value obtained by averaging 100 measured particles was determined as an average primary particle diameter.

[Amount of C] It was measured using Series2 CHNS/O Analyzer 2400 (commercially available from Perkin Elmer).

In addition, various physical properties of optical members having cured films obtained in examples and comparative examples were measured and evaluated by the following measurement methods.

(1) Hardness Test

The hardness of the cured film formed on a glass substrate was measured using a dynamic ultra-micro hardness tester DUH-211 (commercially available from Shimadzu Corporation). Determination criteria were as follows.

A: The hardness was improved by 10% or more compared to Comparative Example 1
B: The hardness was 10% compared to Comparative Example 1
C: The hardness was reduced by 10% or more compared to Comparative Example 1

(2) Abrasion Resistance Test

The surface of the cured film formed on a urethane plastic lens substrate was rubbed with Steel Wool #0000, and scratch resistance was visually determined. Here, a condition for the abrasion resistance test was 10 reciprocations under a load of 1 kg. Determination criteria were as follows.

A: No scratches could be confirmed
B: Some scratches could be confirmed
C: Noticeable scratches could be confirmed (3) Adhesion Test The cured film formed on the urethane plastic lens substrate was cross-cut with 100 squares at intervals of 1 mm, and an adhesive tape (cellophane tape, product, commercially available from Nichiban Co., Ltd.) was strongly attached to the cross-cut parts, and the adhesive tape was then rapidly peeled off, and it was checked whether the cured film was peeled off thereafter. Evaluation criteria were as follows.

A: There was no peeling off or peeling off was confirmed in less than 5 squares out of 100 squares.
B: Peeling off was confirmed in 5 to 30 squares out of 100 squares
C: Peeling off was confirmed in 31 to 60 squares out of 100 squares
D: Peeling off was confirmed in 61 to 90 squares out of 100 squares
E: Peeling off was confirmed in 91 squares or more out of 100 squares (4) Transparency Test Under a fluorescent lamp in a dark room, it was visually checked whether there was fogging on the cured film formed on the urethane plastic lens substrate.
Determination criteria were as follows.
A: Almost no fogging occurred
B: Fogging occurred, but there was no problem for a transparent cured film
C: Whitening was noticeably expressed (5) Cloudiness Test A haze value of the cured film formed on the glass substrate was measured using a haze meter (NDH7000 commercially available from Denshoku Industries Co., Ltd.).
Determination criteria were as follows.
A: The haze value was less than 0.2
B: The haze value was 0.2 or more and less than 0.5
C: The haze value was 0.5 or more Production Example 1: Preparation of Metal Oxide Colloid Particles (A) Serving as Nuclei
(Preparation of (A1))

568.3 g of pure water was put into a 2 L container, and 191.7 g of a 25% by mass tetramethyl ammonium hydroxide aqueous solution, 8.9 g of metastannic acid (containing 7.5 g in terms of $SnO_2$), 142 g of titanium tetraisopropoxide (containing 40 g in terms of $TiO_2$), and 49.2 g of oxalic acid dihydrate (containing 35.1 g in terms of oxalic acid) were added thereto with stirring. In the obtained mixed solution, the molar ratio of oxalic acid/titanium atom was 0.78, and the molar ratio of tetramethyl ammonium hydroxide/titanium atom was 1.05. 950 g of the mixed solution was left at 80° C. for 2 hours, and additionally decompressed to 580 Torr and left for 2 hours to prepare a titanium mixed solution. The pH of the prepared titanium mixed solution was 5.1, the conductivity was 30.9 mS/cm, and the total metal oxide concentration (total amount of $TiO_2$ and $SnO_2$) was 5.0% by mass. 950 g of the titanium mixed solution was put into a 3 L glass-lined autoclave container, and subjected to a hydrothermal treatment at 140° C. for 5 hours. After cooling was performed to room temperature, the solution taken out after the hydrothermal treatment was a water dispersion sol of light milky white titanium oxide colloid particles. In the obtained sol, the pH was 3.9, the conductivity was 32.6 mS/cm, the total metal oxide concentration (total amount of $TiO_2$ and $SnO_2$) was 5.0% by mass, 5.0% by mass of tetramethyl ammonium hydroxide was contained, 3.7% by mass of oxalic acid was contained, the average particle diameter measured by a dynamic light scattering method (dynamic light scattering method particle diameter) was 16 nm, and in transmission electron microscope observation, elliptical particles having an average primary particle diameter of 5 to 10 nm were observed. A powder obtained by drying the obtained sol at 110° C. was subjected to X-ray diffraction analysis, and it was confirmed that the powder was a rutile crystal. The molar ratio of $SnO_2/TiO_2$ was 0.1. The obtained titanium oxide-tin oxide colloid particles were used as titanium oxide-containing nuclei particles (A1).

Production Example 2: Preparation of Metal Oxide Colloid Particles (A) Serving as Nuclei
(Preparation of (A2))

1,394.8 g of pure water was put into a 3 L container, 101 g of oxalic acid dihydrate (commercially available from Ube Industries, Ltd.), 227 g of titanium tetraisopropoxide (containing 64 g in terms of $TiO_2$, commercially available from Kanto Chemical Co., Inc.), and 410.5 g of a 25% by mass tetramethyl ammonium hydroxide aqueous solution (commercially available from Tama Chemicals Co., Ltd.) were added thereto with stirring. In the obtained mixed solution, the molar ratio of oxalic acid/titanium atom was 1.4, and the molar ratio of tetramethyl ammonium hydroxide/oxalic acid was 1.35. 2,133 g of the mixed solution was left under an atmospheric pressure in an open system at 88 to 92° C. for 3 hours, and the byproduct isopropanol was removed by distillation to prepare 1,939 g of a titanium-containing aqueous solution. 194 g of pure water was added to the obtained titanium-containing aqueous solution, and the concentration of the titanium-containing aqueous solution in terms of $TiO_2$ was adjusted to 3.0% by mass. The titanium-containing aqueous solution after the concentration was adjusted had a pH of 4.7 and a conductivity of 31.4 mS/cm. 2,133 g of the titanium-containing aqueous solution was put into a 3 L stainless steel autoclave container and subjected to a hydrothermal treatment at 140° C. for 5 hours. After cooling was performed to room temperature, the solution taken out after the hydrothermal treatment was a water dispersion sol of titanium oxide colloid particles with high transparency. In the obtained sol, the specific gravity was 1.037, the pH was 3.8, the conductivity was 35.7 mS/cm, the $TiO_2$ concentration was 3.0% by mass, the concentration of tetramethyl ammonium hydroxide was 4.8% by mass, the concentration of oxalic acid was 3.4% by mass, the average particle diameter measured by a dynamic light scattering method (dynamic light scattering method particle diameter) was 12 nm, the viscosity was 3.2 mPa·s (B type viscometer), and in transmission electron microscope observation, substantially spherical particles having an average primary particle diameter of 5 to 8 nm were observed. A powder obtained by drying the obtained sol at 110° C. was subjected to X-ray diffraction analysis, and it was confirmed that the powder was an anatase crystal. The obtained titanium oxide colloid particles were used as titanium oxide-containing nuclei particles (A2).

Production Example 3: Preparation of Inorganic Oxide Colloid Particles (B) Serving as a Coating (Preparation of (B1))

77.2 g of JIS No. 3 sodium silicate (containing 29.8% by mass of $SiO_2$, commercially available from Fuji Chemical Industries Co., Ltd.) was dissolved in 1,282 g of pure water, and 20.9 g of sodium stannate $NaSnO_3.H_2O$ (containing 55.1% by mass of $SnO_2$, commercially available from Showa Kako Corporation) was then dissolved. The obtained aqueous solution was passed through a column filled with a hydrogen type cation exchange resin (amberlite (registered trademark) IR-120B), and 2,634 g of a water dispersion sol of acidic silicon dioxide-stannic oxide composite colloid particles (B1) (pH 2.4, containing 0.44% by mass of SnO, and 0.87% by mass of $SiO_2$, the mass ratio of $SiO_2/SnO_2$ of 2.0) was obtained. Next, 6.9 g of diisopropylamine was added to the obtained water dispersion sol.

The obtained sol was a water dispersion sol of alkaline silicon dioxide-stannic oxide composite colloid particles (B1) and had a pH of 8.0. In the water dispersion sol, colloid particles having an average primary particle diameter of 1 to 4 nm was observed with a transmission electron microscope.

Production Example 4: Preparation of Modified Metal Oxide Colloid Particles (C) (Preparation of (C1))

70.8 g of zirconium oxychloride (containing 21.19% by mass of $ZrO_2$, commercially available from Daiichi Kigenso Kagaku Kogyo Co., Ltd.) was diluted with 429.2 g of pure water to prepare 500 g of a zirconium oxychloride aqueous solution (containing 3.0% by mass of $ZrO_2$), and 1,298.7 g of the water dispersion sol of the titanium oxide-containing nuclei particles (A1) prepared in Production Example 1 was added thereto with stirring. Next, hydrolysis was performed by performing heating at 95° C., and a water dispersion sol of titanium oxide-containing nuclei particles (A3) having a zirconium oxide thin film layer formed on the surfaces was obtained.

The obtained water dispersion sol had a pH of 1.2 and a total metal oxide concentration (total amount of $TiO_2$, $ZrO_2$ and $SnO_2$) of 3.8% by mass, and in transmission electron microscope observation of the sol, colloid particles having an average primary particle diameter of 5 to 10 nm were observed.

2,041.2 g of the obtained water dispersion sol was added to 1,763.3 g of the water dispersion sol of the alkaline silicon dioxide-stannic oxide composite colloid particles (B1) prepared in Production Example 3 with stirring. Next, the sol was passed through a column filled with 500 ml of an anion exchange resin (amberlite (registered trademark) IRA-410, commercially available from Organo Corporation). Next, the water dispersion sol after passing through the column was heated at 95° C. for 3 hours and then concentrated by an ultrafiltration membrane method, and a water dispersion sol of titanium oxide-containing metal oxide particles modified with a silicon dioxide-stannic oxide composite oxide was obtained. The total metal oxide concentration of the obtained water dispersion sol was 20% by mass, and the average primary particle diameter was 6 to 12 nm in transmission electron microscope observation of the sol.

Next, a dispersion medium for the obtained water dispersion sol was replaced with methanol using a rotary evaporator to obtain a methanol dispersion sol of titanium oxide-containing metal oxide particles (C1) modified with a silicon dioxide-stannic oxide composite oxide. In the methanol dispersion sol, the concentration of all metal oxides ($TiO_2$, $ZrO_2$, $SnO_2$, and $SiO_2$) was 30.5% by mass, the viscosity was 1.8 mPa·s, the average particle diameter measured by a dynamic light scattering method (DLS) (dynamic light scattering method particle diameter) was 20 nm, and the water content was 1.5% by mass.

Production Example 5: Preparation of Modified Metal Oxide Colloid Particles (C) (Preparation of (C2))

1,500 g of a water dispersion sol of the titanium oxide-containing nuclei particles (A2) prepared in Production Example 2 was put into a 3 L container, 511 g of a water dispersion sol of the alkaline silicon dioxide-stannic oxide composite colloid particles (B1) prepared in Production Example 3 was added thereto, and heating was performed at a temperature of 95° C. for 2 hours. Then, the mixture was passed through a column filled with a hydrogen type cation exchange resin (amberlite (registered trademark) IR-120B), and thus an acidic water dispersion sol of titanium oxide-containing metal oxide particles modified with a silicon dioxide-stannic oxide composite oxide was obtained. In addition, a dispersion medium for the obtained water dispersion sol was replaced with methanol using a rotary evaporator to obtain a methanol dispersion sol of titanium oxide-containing metal oxide particles (C2) modified with a silicon dioxide-stannic oxide composite oxide. In the methanol dispersion sol, the concentration of all metal oxides ($TiO_2$, $SiO_2$, and $SnO_2$) was 30.5% by mass, the viscosity was 2.0 mPa·s, the average particle diameter measured by a dynamic light scattering method (DLS) (dynamic light scattering method particle diameter) was 15 nm, the average primary particle diameter in transmission electron microscope observation was 6 to 12 nm, and the water content was 1.2% by mass.

Example 1

(Preparation of Inorganic Oxide Particles with the Surface to which an Organized Silicon Compound Having a Nitrogen-Containing Heterocyclic Group was Bonded)

200 g of the methanol dispersion sol of the titanium oxide-containing metal oxide particles (C1) modified with a silicon dioxide-stannic oxide composite oxide obtained in Production Example 4 was put into a container, and 0.3 g of a benzotriazole silane compound (X-12-1214A commercially available from Shin-Etsu Chemical Co., Ltd.) was added thereto with stirring, a reaction was caused under reflux for 5 hours, and 200.3 g of a methanol dispersion sol of titanium oxide-containing metal oxide particles (inorganic oxide particles 1) modified with a silicon dioxide-stannic oxide composite oxide having a benzotriazole silane compound bonded to the surface was obtained through a vacuum concentration process using an evaporator.

In the obtained sol, the specific gravity was 1.064, the viscosity was 1.5 mPa·s, the total metal oxide concentration was 30.5% by mass, the water content was 0.8% by mass, and an average particle diameter measured by a dynamic light scattering method (dynamic light scattering method particle diameter) was 19 nm. Here, the amount of C was 0.15% in the dry powder. In addition, the obtained inorganic oxide particles 1 contained 0.30% by mass of the benzotriazole silane compound with respect to the amount of all metal oxides of the titanium oxide-containing metal oxide particles (C1).

(Production of Coating Solution)

70 parts by mass of γ-glycidoxypropyltrimethoxysilane was put into a glass container having a magnetic stirrer, and 21.7 parts by mass of 0.01 N hydrochloric acid was added dropwise thereto for 3 hours with stirring. After dropwise addition was completed, the mixture was stirred for 24 hours to obtain a partial hydrolyzate of γ-glycidoxypropyltrimethoxysilane. Next, 78.3 parts by mass of propylene glycol monomethyl ether, 65.2 parts by mass of methanol, 100 parts by mass of a methanol dispersion sol (whose concentration was adjusted to 30.0% by mass in terms of all metal oxides; hereinafter the same) of the inorganic oxide particles 1 obtained above (titanium oxide-containing metal oxide particles modified with a silicon dioxide-stannic oxide composite oxide with a benzotriazole silane compound bonded to the surface), and additionally, 2.6 parts by mass of aluminum acetylacetonate as a curing agent were added to the above partial hydrolyzate of γ-glycidoxypropyltrimethoxysilane, and the mixture was sufficiently stirred to produce a coating solution for hard coat.

(Production and Evaluation of Cured Film)

A urethane plastic lens (refractive index $n_D$=1.60) substrate and a glass substrate were prepared, a coating solution for hard coat was applied thereto by a dip coating method (film thickness of 3 μm), a solvent was evaporated at 80° C. for 10 minutes, a heat treatment was then performed at 120° C. for 2 hours, and a coating film was cured to obtain a cured film.

The tests shown in the above (1) to (5) were performed. The evaluation results are shown in Table 1.

Example 2

A reaction under reflux was caused and a vacuum concentration process was then performed using an evaporator in the same manner as in Example 1 except that a methanol dispersion sol of titanium oxide-containing metal oxide particles (C2) modified with the silicon dioxide-stannic oxide composite oxide obtained in Production Example 5 was used in place of a methanol dispersion sol of the particles (C1) obtained in Production Example 4 used in Example 1 (preparation of inorganic oxide particles with the surface to which an organized silicon compound having a nitrogen-containing heterocyclic group was bonded), and a methanol dispersion sol of titanium oxide-containing metal oxide particles (inorganic oxide particles 2) modified with a silicon dioxide-stannic oxide composite oxide with a benzotriazole silane compound bonded to the surface was obtained.

In the obtained sol, the specific gravity was 1.058, the viscosity was 1.3 mPa·s, the total metal oxide concentration was 30.5% by mass, the water content was 0.6% by mass, and the average particle diameter measured by a dynamic light scattering method (dynamic light scattering method particle diameter) was 15 nm. Here, the amount of C was 0.18% in the dry powder. In addition, the obtained inorganic oxide particles 2 contained 0.35% by mass of the benzotriazole silane compound with respect to the amount of all metal oxides of the titanium oxide-containing metal oxide particles (C2). In addition, a coating solution was produced and a cured film was produced and evaluated in the same manner as in Example 1.

Example 3

A reaction under reflux was caused and a vacuum concentration process was then performed using an evaporator in the same manner as in Example 1 except that the amount of the benzotriazole silane compound added in Example 1 (preparation of inorganic oxide particles with the surface to which an organized silicon compound having a nitrogen-containing heterocyclic group was bonded) was changed to 0.6 g, and a methanol dispersion sol of titanium oxide-containing metal oxide particles (inorganic oxide particles 3) modified with a silicon dioxide-stannic oxide composite oxide with a benzotriazole silane compound bonded to the surface was obtained.

In the obtained sol, the specific gravity was 1.064, the viscosity was 1.6 mPa·s, the total metal oxide concentration was 30.5% by mass, the water content was 0.8% by mass, and an average particle diameter measured by a dynamic light scattering method (dynamic light scattering method particle diameter) was 18 nm. Here, the amount of C was 0.32% in the dry powder. In addition, the obtained inorganic oxide particles 3 contained 0.64% by mass of the benzotriazole silane compound with respect to the amount of all metal oxides of the titanium oxide-containing metal oxide particles (C1). In addition, a coating solution was produced and a cured film was produced and evaluated in the same manner as in Example 1.

Example 4

A reaction under reflux was caused and a vacuum concentration process was then performed using an evaporator in the same manner as in Example 1 except that the amount of the benzotriazole silane compound added in Example 1 (preparation of inorganic oxide particles with the surface to which an organized silicon compound having a nitrogen-containing heterocyclic group was bonded) was changed to 1.8 g, and a methanol dispersion sol of titanium oxide-containing metal oxide particles (inorganic oxide particles 4) modified with a silicon dioxide-stannic oxide composite oxide with a benzotriazole silane compound bonded to the surface was obtained.

In the obtained sol, the specific gravity was 1.063, the viscosity was 1.6 mPa·s, the total metal oxide concentration was 30.4% by mass, the water content was 0.8% by mass, and the average particle diameter measured by a dynamic light scattering method (dynamic light scattering method particle diameter) was 19 nm. Here, the amount of C was 0.95% in the dry powder. In addition, the obtained inorganic oxide particles 4 contained 1.88% by mass of the benzotriazole silane compound with respect to the amount of all metal oxides of the titanium oxide-containing metal oxide particles (C1). In addition, a coating solution was produced and a cured film was produced and evaluated in the same manner as in Example 1.

Example 5

70 parts by mass of γ-glycidoxypropyltrimethoxysilane and 1.3 parts by mass of 3-aminopropyltrimethoxysilane were put into a glass container having a magnetic stirrer, and the mixture was stirred for 1 hour, and 1.9 parts by mass of isocyanate propyltriethoxysilane was then added thereto, and the mixture was stirred for 1 hour. Next, 21.7 parts by mass of 0.01 N hydrochloric acid was added thereto with stirring, the mixture was stirred for 24 hours, and a partial hydrolyzate of γ-glycidoxypropyltrimethoxysilane, 3-aminopropyltrimethoxysilane, and isocyanate propyltriethoxysilane was obtained. Next, 78.3 parts by mass of propylene glycol monomethyl ether, 65.2 parts by mass of methanol, 100 parts by mass of a methanol dispersion sol (containing 30.5% by mass in terms of all metal oxides) of the inorganic oxide particles 1 (titanium oxide-containing metal oxide particles modified with a silicon dioxide-stannic oxide composite oxide with a benzotriazole silane compound bonded to the surface) prepared in Example 1 (preparation of inorganic oxide particles with the surface to which an organized silicon compound having a nitrogen-containing heterocyclic group was bonded), and additionally, 2.6 parts by mass of aluminum acetylacetonate as a curing agent were added to the above partial hydrolyzate of γ-glycidoxypropyltrimethoxysilane, 3-aminopropyltrimethoxysilane, and isocyanate propyltriethoxysilane, and the mixture was sufficiently stirred to produce a coating solution for hard coat.

A cured film was produced and evaluated in the same manner as in Example 1.

Example 6

A reaction under reflux was caused and a vacuum concentration process was then performed using an evaporator in the same manner as in Example 1 except that N-3-(trimethoxysilylpropyl)-1H-benzimidazole-1-carboxamide (X-12-1078 commercially available from Shin-Etsu Chemical Co., Ltd.) was used in place of the benzotriazole silane compound used in Example 1 (preparation of inorganic oxide particles with the surface to which an organized silicon compound having a nitrogen-containing heterocyclic group was bonded), and the amount added thereof was changed to 0.6 g, and a methanol dispersion sol of titanium oxide-containing metal oxide particles (inorganic oxide particles 5) modified with a silicon dioxide-stannic oxide composite oxide with N-3-(trimethoxysilylpropyl)-1H-benzimidazole-1-carboxamide bonded to the surface was obtained.

In the obtained sol, the specific gravity was 1.063, the viscosity was 1.6 mPa·s, the total metal oxide concentration was 30.4% by mass, the water content was 0.8% by mass, and the average particle diameter measured by a dynamic light scattering method (dynamic light scattering method particle diameter) was 19 nm. Here, the amount of C was 0.5% in the dry powder. In addition, the obtained inorganic oxide particles 5 contained 0.59% by mass of N-3-(trimethoxysilylpropyl)-1H-benzimidazole-1-carboxamide with respect to the amount of all metal oxides of the titanium oxide-containing metal oxide particles (C1). In addition, a coating solution was produced and a cured film was produced and evaluated in the same manner as in Example 1.

Example 7

A reaction under reflux was caused and a vacuum concentration process was then performed using an evaporator in the same manner as in Example 6 except that the amount of N-3-(trimethoxysilylpropyl)-1H-benzimidazole-1-carboxamide added in Example 6 was changed to 1.6 g, and a methanol dispersion sol of titanium oxide-containing metal oxide particles (inorganic oxide particles 6) modified with a silicon dioxide-stannic oxide composite oxide with N-3-(trimethoxysilylpropyl)-1H-benzimidazole-1-carboxamide bonded to the surface was obtained.

In the obtained sol, the specific gravity was 1.063, the viscosity was 1.7 mPa·s, the total metal oxide concentration was 30.5% by mass, the water content was 0.8% by mass, and the average particle diameter measured by a dynamic light scattering method (dynamic light scattering method particle diameter) was 19 nm. Here, the amount of C was 0.9% in the dry powder. In addition, the obtained inorganic oxide particles 6 contained 1.48% by mass of N-3-(trimethoxysilylpropyl)-1H-benzimidazole-1-carboxamide with respect to the amount of all metal oxides of the titanium oxide-containing metal oxide particles (C1). In addition, a coating solution was produced and a cured film was produced and evaluated in the same manner as in Example 1.

Example 8

A reaction under reflux was caused and a vacuum concentration process was then performed using an evaporator in the same manner as in Example 6 except that the amount of N-3-(trimethoxysilylpropyl)-1H-benzimidazole-1-carboxamide added in Example 6 was changed to 3.2 g, and a methanol dispersion sol of titanium oxide-containing metal oxide particles (inorganic oxide particles 7) modified with a silicon dioxide-stannic oxide composite oxide with N-3-(trimethoxysilylpropyl)-1H-benzimidazole-1-carboxamide bonded to the surface was obtained.

In the obtained sol, the specific gravity was 1.065, the viscosity was 1.6 mPa·s, the total metal oxide concentration was 30.7% by mass, the water content was 0.7% by mass, and the average particle diameter measured by a dynamic light scattering method (dynamic light scattering method particle diameter) was 20 nm. Here, the amount of C was 1.2% in the dry powder. In addition, the obtained inorganic oxide particles 7 contained 2.84% by mass of N-3-(trimethoxysilylpropyl)-1H-benzimidazole-1-carboxamide with respect to the amount of all metal oxides of the titanium oxide-containing metal oxide particles (C1).

In addition, a coating solution was produced and a cured film was produced and evaluated in the same manner as in Example 1.

Example 9

A reaction under reflux was caused and a vacuum concentration process was then performed using an evaporator in the same manner as in Example 6 except that the amount of N-3-(trimethoxysilylpropyl)-1H-benzimidazole-1-carboxamide added in Example 6 was changed to 6.4 g, and a methanol dispersion sol of titanium oxide-containing metal oxide particles (inorganic oxide particles 8) modified with a silicon dioxide-stannic oxide composite oxide with N-3-(trimethoxysilylpropyl)-1H-benzimidazole-1-carboxamide bonded to the surface was obtained.

In the obtained sol, the specific gravity was 1.062, the viscosity was 1.5 mPa·s, the total metal oxide concentration was 30.4% by mass, the water content was 0.8% by mass, and the average particle diameter measured by a dynamic light scattering method (dynamic light scattering method particle diameter) was 16 nm. Here, the amount of C was 0.5% in the dry powder. In addition, the obtained inorganic oxide particles 8 contained 4.53% by mass of N-3-(trimethoxysilylpropyl)-1H-benzimidazole-1-carboxamide with respect to the amount of all metal oxides of the titanium oxide-containing metal oxide particles (C1).

In addition, a coating solution was produced and a cured film was produced and evaluated in the same manner as in Example 1.

Example 10

A reaction under reflux was caused and a vacuum concentration process was then performed using an evaporator in the same manner as in Example 1 except that the amount of the benzotriazole silane compound added in Example 1 (preparation of inorganic oxide particles with the surface to which an organized silicon compound having a nitrogen-containing heterocyclic group was bonded) was changed to 15.0 g, and a methanol dispersion sol of titanium oxide-containing metal oxide particles (inorganic oxide particles 9) modified with a silicon dioxide-stannic oxide composite oxide with a benzotriazole silane compound bonded to the surface was obtained.

In the obtained sol, the specific gravity was 1.060, the viscosity was 1.6 mPa·s, the total metal oxide concentration was 30.6% by mass, the water content was 0.5% by mass, and the dynamic light scattering method particle diameter was 20 nm. Here, the amount of C was 0.9% in the dry powder. In addition, the obtained inorganic oxide particles 9 contained 7.5% by mass of the benzotriazole silane compound with respect to the amount of all metal oxides of the titanium oxide-containing metal oxide particles (C1).

In addition, a coating solution was produced and a cured film was produced and evaluated in the same manner as in Example 1.

Example 11

A reaction under reflux was caused and a vacuum concentration process was then performed using an evaporator in the same manner as in Example 6 except that the amount of N-3-(trimethoxysilylpropyl)-1H-benzimidazole-1-carboxamide added in Example 6 was changed to 12.0 g, and a methanol dispersion sol of titanium oxide-containing metal oxide particles (inorganic oxide particles 10) modified with a silicon dioxide-stannic oxide composite oxide with N-3-(trimethoxysilylpropyl)-1H-benzimidazole-1-carboxamide bonded to the surface was obtained.

In the obtained sol, the specific gravity was 1.058, the viscosity was 1.6 mPa·s, the total metal oxide concentration was 30.4% by mass, the water content was 0.5% by mass, and the dynamic light scattering method particle diameter was 21 nm. Here, the amount of C was 0.8% in the dry powder. In addition, the obtained inorganic oxide particles 10 contained 7.2% by mass of N-3-(trimethoxysilylpropyl)-1H-benzimidazole-1-carboxamide with respect to the amount of all metal oxides of the titanium oxide-containing metal oxide particles (C1).

In addition, a coating solution was produced and a cured film was produced and evaluated in the same manner as in Example 1.

Comparative Example 1

(Production of coating solution) was performed in the same manner as in Example 1 except that a methanol dispersion sol of the titanium oxide-containing metal oxide particles (C1) modified with the silicon dioxide-stannic oxide composite oxide described in Production Example 4 was used in place of a methanol dispersion sol of titanium oxide-containing metal oxide particles modified with a silicon dioxide-stannic oxide composite oxide with the benzotriazole silane compound obtained in Example 1 (preparation of inorganic oxide particles with the surface to which an organized silicon compound having a nitrogen-containing heterocyclic group was bonded) bonded thereto, and (production and evaluation of cured film) was then performed.

Comparative Example 2

(Production of coating solution) was performed in the same manner as in Example 1 except that a UV absorber-containing sol in which 0.6 g of a benzotriazole UV absorber (DAINSORB T-0 commercially available from Daiwa Fine Chemicals Co., Ltd.) was added to a methanol dispersion sol of the titanium oxide-containing metal oxide particles (C1) modified with a silicon dioxide-stannic oxide composite oxide was used in place of a methanol dispersion sol of titanium oxide-containing metal oxide particles modified with a silicon dioxide-stannic oxide composite oxide with the benzotriazole silane compound obtained in Example 1 (preparation of inorganic oxide particles with the surface to which an organized silicon compound having a nitrogen-containing heterocyclic group was bonded) bonded thereto, and (production and evaluation of cured film) was then performed.

TABLE 1

|  | Hardness | Abrasion resistance | Adhesion | Transparency (visibility) | Cloudiness (haze value) |
| --- | --- | --- | --- | --- | --- |
| Example 1 | A | A | A | A | A |
| Example 2 | A | A | A | A | A |
| Example 3 | A | A | A | A | A |
| Example 4 | A | A | A | A | A |
| Example 5 | A | A | A | A | A |
| Example 6 | A | A | A | A | A |
| Example 7 | A | A | A | A | A |

TABLE 1-continued

| | Hardness | Abrasion resistance | Adhesion | Transparency (visibility) | Cloudiness (haze value) |
|---|---|---|---|---|---|
| Example 8 | A | A | A | A | A |
| Example 9 | A | A | A | A | A |
| Example 10 | C | B | A | A | B |
| Example 11 | A | A | A | B | C |
| Comparative Example 1 | — | B | C | A | A |
| Comparative Example 2 | B | C | C | A | A |

* Hardness (Examples 1 to 11 and Comparative Example 2) shows an evaluation compared with Comparative Example 1.

As shown in Table 1, as to Comparative Example 1 using particles in which no organosilicon compound having a nitrogen-containing heterocyclic group was bonded to the surface of the modified metal oxide colloid particles (C) and Comparative Example 2 in which an organosilicon compound having a nitrogen-containing heterocyclic group was separately added without bonding, the result for transparency (visibility and haze value) was favorable, but the hardness, abrasion resistance and adhesion could not be said to be sufficient.

On the other hand, as to the coating compositions of Examples 1 to 11 using the inorganic oxide particles 1 to 10 in which an organosilicon compound having a nitrogen-containing heterocyclic group was bonded to the surface of the modified metal oxide colloid particles (C), all of the obtained cured films had excellent results in adhesion, and it was possible to obtain an additional effect of obtaining a film having favorable adhesion which is the most basic physical property of the coating composition.

In addition, as can be seen from the results of Example 10 and Example 11, to satisfy all of the hardness, abrasion resistance, transparency, and cloudiness in addition to adhesion, a proportion of the organosilicon compound having a nitrogen-containing heterocyclic group bonded to the surface of the modified metal oxide (C) was adjusted, and therefore, as can be seen from the results of Example 1 to Example 9, the hardness, abrasion resistance, and adhesion were excellent, and the results were excellent in transparency regarding both the visibility (transparency) and the haze value (cloudiness) under a fluorescent lamp.

INDUSTRIAL APPLICABILITY

An optical member having a cured film formed from the coating composition containing inorganic oxide particles of the present invention can be used for camera lenses, vehicle window glasses, and optical filters attached to liquid crystal displays, plasma displays, or the like, for example, in addition to spectacle lenses.

The invention claimed is:
1. Inorganic oxide particles obtained by bonding an organosilicon compound having a nitrogen-containing heterocyclic group to the surface of modified metal oxide colloid particles (C) having an average particle diameter of 2 to 100 nm, which include metal oxide colloid particles (A) having an average primary particle diameter of 2 to 60 nm as nuclei and with the nuclei surface coated with a coating composed of inorganic oxide colloid particles (B) having an average primary particle diameter of 1 to 4 nm,
wherein the metal oxide colloid particles (A) are colloid particles of an oxide of at least one metal selected from the group consisting of Ti, Fe, Cu, Zn, Y, Zr, Nb, Mo, In, Sn, Sb, Ta, W, Pb, Bi and Ce,
wherein the inorganic oxide colloid particles (B) are colloid particles of an oxide of at least one atom selected from the group consisting of Si, Al, Sn, Zr, Mo, Sb and W and are colloid particles different from the metal oxide colloid particles (A), and
wherein the organosilicon compound having a nitrogen-containing heterocyclic group is a compound of the following Formula (III):

where in Formula (III),
$R^5$ is a $C_{1-8}$ alkyl group, alkoxyalkyl group, or acyl group,
$R^6$ is a methylene group or a $C_{2-20}$ alkylene group,
$R^7$ is a nitrogen-containing heterocyclic group containing 1 to 3 nitrogen atoms but excluding a group containing a pyrazole ring or a pyridine ring, and
n is an integer of 1 to 3,
wherein the nitrogen-containing heterocycle in the nitrogen-containing heterocyclic group is an indole ring, an indoline ring, a carbazole ring, a piperidine ring, a quinoline ring, an imidazoline ring, an imidazolidine ring, a benzimidazole ring, a triazole ring, a benzotriazole ring, or a triazine ring.

2. The inorganic oxide particles according to claim 1, wherein the amount of the organosilicon compound having a nitrogen-containing heterocyclic group is 0.1 to 6.0% by mass based on 100% by mass of a total amount of metal oxides and inorganic oxides of the modified metal oxide colloid particles (C).

3. The inorganic oxide particles according to claim 1, wherein the nitrogen-containing heterocycle in the nitrogen-containing heterocyclic group is a benzimidazole ring, or a benzotriazole ring.

4. The inorganic oxide particles according to claim 1, wherein the modified metal oxide colloid particles (C) are modified metal oxide colloid particles (C) in which one or more intermediate thin film layers formed of any one of a single oxide of at least one atom selected from the group consisting of Si, Al, Sn, Zr, Sb, Nb, Ta and W, a composite oxide of two or more atoms selected from the same group, or a mixture of the single oxide and the composite oxide are interposed between the metal oxide colloid particles (A) serving as nuclei and the inorganic oxide colloid particles (B) serving as a coating.

5. An inorganic oxide aqueous sol or an inorganic oxide organic solvent sol in which the inorganic oxide particles according to claim 1 are dispersed in an aqueous medium or an organic solvent.

6. A coating composition, comprising:
a component (S): an organosilicon compound and/or a silicon-containing substance which is a hydrolyzate thereof; and
a component (T): the inorganic oxide particles according to claim 1,
wherein the organosilicon compound of the component (S) includes at least one organosilicon compound selected from the group consisting of the following compound of Formula (I) and the following compound of Formula (II):

$$(R^1)_a(R^3)_b Si(OR^2)_{4-(a+b)} \quad (I)$$

wherein,
$R^1$ and $R^3$ are each independently an alkyl group, an aryl group, a halogenated alkyl group, a halogenated aryl group or an alkenyl group, or
an organic group which is a monovalent organic group having an epoxy group, an isocyanate group, an acryloyl group, a methacryloyl group, a mercapto group, a ureido group, an amino group or a cyano group and which is bonded to a silicon atom via an Si—C bond,
$R^2$ is a $C_{1-8}$ alkyl group, aryl group, aralkyl group, alkoxyalkyl group, or acyl group,
a and b are each independently an integer of 0, 1, or 2, and a+b is an integer of 0, 1, or 2;

$$[(R^4)_c Si(OX)_{3-c}]_2 Y \quad (II)$$

wherein,
$R^4$ is a $C_{1-5}$ alkyl group,
X is a $C_{1-4}$ alkyl group or acyl group,
Y is a methylene group or a $C_{2-20}$ alkylene group, and
c is an integer of 0 or 1.

7. The coating composition according to claim 6,
wherein a mass proportion of the component (S) contained is 25 to 400 parts by mass with respect to 100 parts by mass of the inorganic oxide particles of the component (T).

8. An optical member having a cured film formed from the coating composition according to claim 6 on the surface of an optical substrate.

9. The optical member according to claim 8, characterized by further comprising an anti-reflective coating on the surface of the cured film formed on the surface of the optical substrate.

10. A coating composition, comprising:
a component (K): at least one resin selected from the group consisting of a thermosetting resin, a thermoplastic resin and a UV curable resin; and
a component (T): the inorganic oxide particles according to claim 1.

11. The coating composition according to claim 10,
wherein a mass proportion of the component (K) contained is 20 to 400 parts by mass with respect to 100 parts by mass of the inorganic oxide particles of the component (T).

* * * * *